Patented Oct. 8, 1940

2,217,065

UNITED STATES PATENT OFFICE 2,217,065

COMPOSITION FOR MAKING A POLYCHROMATIC PRINTING ROLLER OR PLATE, METHOD OF MAKING THE SAME, AND A POLYCHROMATIC PRINTING MEMBER

Isaac Magath, Bronx, N. Y.

No Drawing. Application March 4, 1939,
Serial No. 259,931

5 Claims. (Cl. 101—211)

My invention relates to a new and improved composition for making a polychromatic printing roller or plate, a new and improved method of making the same, and a new and improved polychromatic printing member. The printing member may be a plate or roller or in any other form.

One of the objects of the invention is to produce a composition which will be substantially stable in ordinary humid atmosphere, and which can be prepared and applied at low cost to a metal roller or a metal plate.

The body of the roller or plate may be made of steel, copper, brass or any other material, metallic or non-metallic.

Another object of the invention is to provide a composition which will readily adhere to the surface of the metal body and which will be plastic so that a color design having numerous color components can be readily built up on the surface of the metal body.

Another object of the invention is to provide a method which shall be simple and economical.

Other objects of the invention will be stated in the annexed description which illustrates a preferred embodiment and a preferred example thereof. While I have specified certain preferred substances, certain preferred preparations, and a certain preferred method of manipulation in the annexed example, the invention is not limited to the specific substances or preparations or method of manufacture.

45 grams of dextrin are thoroughly mixed with 55 grams of water at ordinary room temperature of about 70° F. The mixing is done thoroughly so as to produce a thin uniform paste, which is free from any lumps. The dextrin may be designated as the base of the composition.

I prefer to use yellow dextrin, one part of which is soluble in four parts of cold water. Hence about 13.75 grams of the yellow dextrin are dissolved in the 55 grams of water and the remaining 21.25 grams of yellow dextrin form a stable emulsion or suspension in the aqueous solution of the yellow dextrin. I prefer to use yellow dextrin, because when mixed with water, it gives the composition a much better and more solid body than the white dextrin. When the improved composition is made with yellow dextrin, said composition is stretchable and flexible. If made with ordinary white dextrin, the composition which is later described will crack and break when it is bent.

The solution and suspension of the dextrin in the water may be designated as batch No. 1.

I then mix about 11 grams of dry and very finely powdered castile soap or other pure and neutral soap with from 10 to 15 grams of pure wood alcohol or methanol. I can use ethyl alcohol instead of wood alcohol. The alcohol dissolves some of the soap. It does not dissolve the dextrin. The soap should be as finely divided as possible. This mixture may be designated as batch No. 2. Batch No. 2 is prepared by thorough mixing at ordinary room temperature of about 70° F. The excess undissolved finely divided soap forms a suspension in the methanol.

I then add batch No. 2 to batch No. 1 with thorough mixing at room temperature of about 70° F. until a homogeneous mixture has been produced. I then add a small quantity of chemically pure glycerine, not more than about 5 grams, to the mixture of batch No. 1 and batch No. 2, with constant mixing as the glycerine is added. The use of glycerine is optional. The glycerine may be mixed with the soap and methanol, and this mixture may be added to batch No. 1.

The glycerine is added to the mixture of batch No. 1 and batch No. 2, or to batch No. 2 at ordinary room temperature of 70° F. The percentage of glycerine is lowered if the composition is to be used in an unusually humid atmosphere.

The aforesaid final mixture is then put into the upper open vessel of a double boiler, or into an open vessel which is heated by a steam jacket, and the mass or mixture is heated to a temperature which does not exceed 212° F. and preferably at a temperature of about 140° F. to 200° F. and preferably not more than 160° F. This treatment darkens the original canary yellow color of the dextrin. This heating is accompanied by thorough and continuous mixing until the liquid ingredients have partially evaporated and the mass has a consistency like that of putty. The methanol is preferably wholly or substantially evaporated in this step. I then add a suitable coloring matter to the mixture according to the color which is desired. The coloring matter is first mixed with hot water to form a solution or suspension of the coloring matter. I use as little hot water as possible. The proportions of the coloring matter may be greatly varied depending on the printing effect which is desired. The solution or suspension of the coloring matter is thoroughly intermixed with the hot mixture in the upper vessel of the double boiler and the heating and the evaporation of the water is then continued until a coherent plastic mass is secured, which can be kneaded like putty or double. If desired, some of the methanol may be in the mixture when the coloring matter is added thereto, but all or substantially all of the methanol is evaporated after the heating has been completed and prior to the kneading operation later mentioned herein. This monocolor batch serves for reproduction of a single color corresponding to the respective coloring matter. A number of such monocolor batches can be prepared, each batch having coloring matter of a respective single color. Each said batch can then be spread out so as to form layers or sheets or cakes or blocks of uniform thickness. These sheets will readily adhere to the surface of the metal body if its surface is slightly moistened.

In this way a composite mosaic layer having the desired polychromatic design can be caused to adhere to the surface of a metal plate or metal roller or the like, each element of the polychromatic mosaic having one of the desired colors.

This mosaic layer may have spaces between the colored elements. These spaces can be filled with yellow dextrin which has been bleached white by a suitable bleaching agent, such as sodium hydrosulfite. This filling material is made according to the formula and method above mentioned, using no coloring matter or glycerine and five grams of sodium hydrosulfite. If the atmosphere is very dry, a little glycerine, about 2 grams, may be used.

The printing layer on the metal plate or roller is preferably of uniform thickness. The printing layer covers the entire cylindrical surface of the roller.

When this surface layer is finally dried and hardened and it is brought into contact with moist cloth, under suitable pressure, the moisture in the cloth dissolves or removes some of this final hardened printing layer. The dissolved or disintegrated material of the printing layer carries the respective coloring matters therewith and said coloring matters are firmly fixed in or upon the moist cloth. After printing, the cloth is finished in the usual manner, so as to remove the dextrin. The finishing operations include steaming, washing, etc. The cloth may be of any kind, such as wool, cotton, natural silk, artificial silk and the like. By using suitable pressure during the printing process the design can be confined to one side of the cloth or else the polychromatic color design can be printed through the cloth so as to be visible on both sides thereof. The pressure which is used during the printing operation may vary from 50 lbs. per square inch to 100 lbs. per square inch, depending on the thickness of the cloth.

Prior to the final drying of the mass, it has little or no methanol but it has a substantial percentage of water.

I prefer to mix methanol or other liquid having a lower boiling point than water with the soap, as this facilitates the admixture of the soap and alcohol with batch No. 1. Likewise the methanol can be readily evaporated at moderate heat, which is desirable because excess heat would decompose the soap or the coloring matter, or cause the acid dye, if this is used as the coloring matter, to react with the dextrin.

For printing on silk, I prefer to use the usual acid organic dyes of the kind which are ordinarily used in dyeing silk. The preferred dextrin has a yellow color, and if the mass is treated at a temperature which is too high, there is danger of an undesirable reaction between an acid dye and the dextrin. This is avoided by my process.

In printing on cotton I use the usual direct dyes, and I use the usual acid dyes or other dyes in printing on wool.

The dyes which are used may be either soluble in water or they may form an emulsion with the soap ingredient of the composition. Coloring matters of any kind, including pigments, may be used, but I prefer to use non-pigment coloring matter, such as the usual dyes.

The plastic material which is used for making the color mosaic on the printing plate or roller has from 8% to 10% of water before it has finally dried and hardened. This proportion is by weight. This plastic material is applied under suitable high pressure to the moistened surface of the metal roller until the mosaic surface layer has been formed, and the surface layer is then allowed to finally dry at about 70° F., until it is firm and hard, to withstand the printing pressure.

One of the striking characteristics of the improved plastic composition is that it does not stick to the dry fingers or to a dry metal cutting knife, if the atmosphere has a normal humidity of 40 to 65, although it adheres readily and strongly to the moistened surface of the metal body of the printing plate or roller. Hence the material can be readily and accurately shaped and handled while it is plastic, to form the desired mosaic layer.

After the plastic mass has been thus made it can be kneaded vigorously in an ordinary kneading machine at a temperature of about 70° F., so as to make the plastic mass more uniform and to distribute the coloring matter with absolute uniformity throughout the mass. The improved composition does not stick to the kneading mechanism. This kneading operation is performed before the plastic composition is rolled into sheet form and applied to the surface of the printing member.

If desired, the water in the composition can be in sufficient proportion to give the composition the consistency of a thick syrup, before operating on the composition by the kneading machine. This thick syrup can be poured into the kneading machine, and said machine can have a steam jacket, so as to evaporate water during the kneading operation. This kneading machine is of the well-known type which is used in working up batches of unvulcanized rubber. It has blades which pull and turn the material. When the composition leaves the kneading machine, it has from 8% to 10% of water, and it is like putty, so that it can be shaped into rods, cakes, blocks, or any other shape, by hand or by machine pressure.

The improved composition consists preferably of yellow dextrin, soap, a relatively small percentage of water, and non-pigment coloring matter, and a small percentage of glycerine, whose use is optional. However other ingredients may be added to said composition without departing from the invention.

The exact proportions above mentioned are important and desirable in securing a plastic and coherent composition which does not adhere to the fingers or to a metal surface unless the fingers or the metal surface are moistened. The use of the type of dextrin previously mentioned is also highly preferable.

However the invention is not necessarily limited to the use of the materials previously mentioned because other types of dextrin can be used, and starch can be used instead of dextrin. Likewise the soap can be replaced by other fillers which are soluble in water. According to the invention the dextrin and the soap take up the dye. The major part of the dye is adsorbed by the dextrin. Since the dextrin is somewhat soluble in cold water, the printing operation can be carried out at ordinary room temperature of 70° F. The moist cloth takes up the dextrin and the dye. The resultant printed fabric is substantially fast to ordinary washing and cleaning operations, as though it had been dyed or printed in the usual manner.

The percentage of dye which is added to the plastic mixture may vary from 1/8 gram to 6 grams to a batch, made according to the formula previously described, depending on the dye which is used. If too much dye is added, the mass loses its plasticity and it breaks easily.

In estimating the percentage of water in the plastic composition, this is calculated upon the weight of the dextrin and soap and glycerine, excluding the weight of the coloring matter. After the composition has set on the metal body, it has much less than 8% of water.

Yellow dextrin can be made by the Heuse torrefaction process, by using a final temperature in said process of from 130° C. to 140° C. In making white dextrin the mass is finally heated at a temperature of 100° C. to 120° C.

The invention is not limited to the sequence of the steps which are stated herein.

The improved composition is preferably free from oils, resins, and other materials which are insoluble in water. The dextrin is only slightly soluble in the water of the moist cloth. However, there is enough soap in the hardened printing composition to cause the moist cloth to take up the necessary thin surface layer of the hardened printing layer.

I claim:

1. A method of making a printing composition which consists in making a first mixture of yellow dextrin with water which dissolves only a part of the dextrin, said first mixture being made at a temperature which is sufficiently low to prevent the yellow dextrin from substantially gelatinizing, then adding to said first mixture a second mixture which consists substantially of finely divided soap and insufficient methanol to dissolve the soap, adding a dye to said admixed mixtures, then evaporating the methanol and part of the water until a plastic and coherent mass has been formed which is substantially nonadherent to dry metal.

2. A pressure-resistant printing layer comprising a mixture of a major proportion of yellow dextrin and a minor proportion of a water-soluble filler, and a uniformly distributed dye, the surface of said layer being capable of being taken up by a moist fabric.

3. A pressure-resistant printing layer which comprises substantially 45 parts of yellow dextrin, 11 parts of finely divided soap uniformly intermixed with the dextrin, and a dye uniformly distributed in said layer.

4. A method of producing a printing composition which consists in intermixing with an aqueous paste of a substance which is selected from a class which consists of starch and dextrin, with a water-soluble binder which is intermixed with a nonaqueous solvent for said binder, said solvent having a lower boiling point than water, said selected substance being substantially insoluble in said solvent, and also adding a dye to said mixture, and then evaporating some of the water in the mixture until the mixture forms a plastic and coherent mass which can be stretched and bent without breaking.

5. A pressure-resistant printing layer comprising a major proportion of yellow dextrin and minor proportions of finely divided soap and of an acid dye, said ingredients being uniformly intermixed, the percentage of acid dye being too small to decompose the dextrin.

ISAAC MAGATH.